(12) United States Patent
Whitener

(10) Patent No.: US 6,575,106 B1
(45) Date of Patent: Jun. 10, 2003

(54) AIR INDUCTION SYSTEM FOR MARINE VESSEL

(75) Inventor: Philip C. Whitener, Bainbridge Island, WA (US)

(73) Assignee: Advanced Marine Concepts, LLC, Bainbridge Island, WA (US)

(*) Notice: Subject to any disclaimer, the term of this patent is extended or adjusted under 35 U.S.C. 154(b) by 0 days.

(21) Appl. No.: 10/126,018

(22) Filed: Apr. 18, 2002

(51) Int. Cl.⁷ ................................................. B63B 1/34
(52) U.S. Cl. ...................................... 114/67 A; 114/291
(58) Field of Search ............................ 114/67 A, 67 R, 114/274, 228, 281, 282, 283, 291

(56) References Cited

U.S. PATENT DOCUMENTS

| | | | | |
|---|---|---|---|---|
| 4,494,477 A | * | 1/1985 | Matthews | 114/287 |
| 4,535,712 A | * | 8/1985 | Matthews | 114/67 A |
| 4,587,918 A | * | 5/1986 | Burg | 114/67 A |
| 5,232,385 A | * | 8/1993 | Hatfield | 440/44 |
| 5,651,327 A | * | 7/1997 | Whitener | 114/271 |
| 5,860,383 A | * | 1/1999 | Whitener | 114/271 |

* cited by examiner

*Primary Examiner*—Stephen Avila
(74) *Attorney, Agent, or Firm*—Black, Lowe & Graham PLLC

(57) ABSTRACT

A marine vessel air induction system introduces air into an under-hull cavity bounded by an underside, first and second sides, and fore and aft planing surfaces. An air inlet receives ambient air. A plenum receives air from the inlet. A fore planing surface has a trailing edge. The trailing edge and the plenum define a step that communicates with the plenum to generate a first pressure that is less than ambient pressure as a free stream of water moves past the step. Air communicated from the plenum is entrainable in the water. A mixing chamber communicates with the step, and the step and the mixing chamber cooperate to permit kinetic energy of the water to increase pressure of entrained air. At an aft end of the mixing chamber, the entrained air exerts a second pressure that is greater than ambient. Air is exhausted upwardly into the cavity.

40 Claims, 12 Drawing Sheets

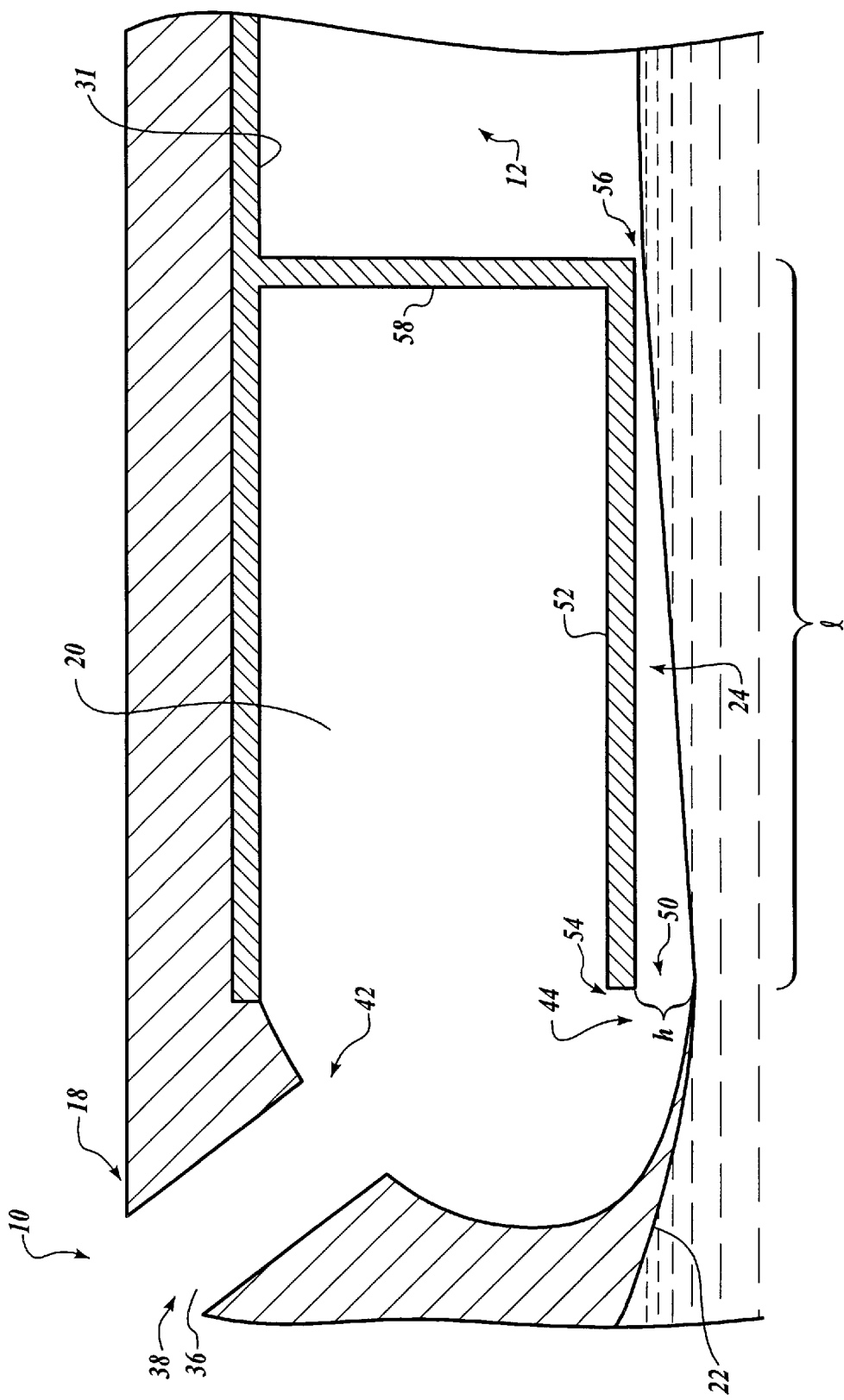

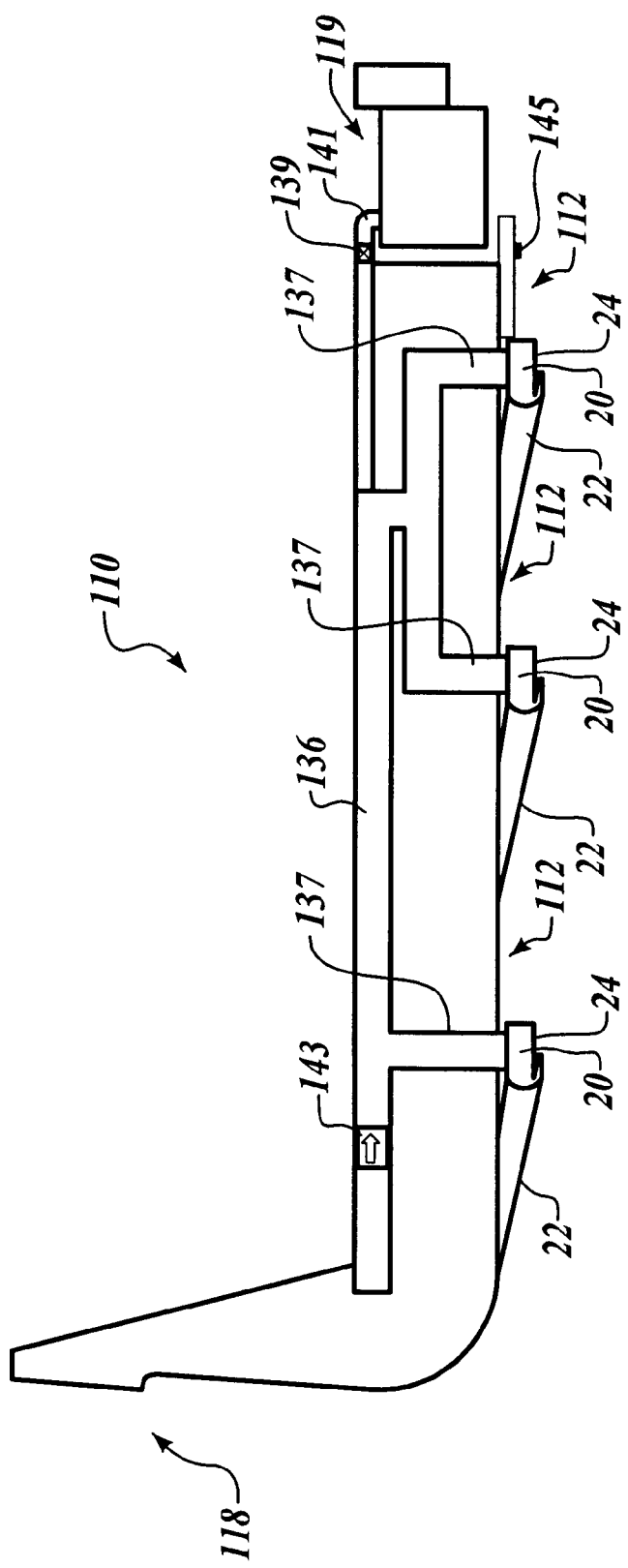

AIR INDUCTION SYSTEM FOR MARINE VESSEL

FIELD OF THE INVENTION

This invention relates generally to air induction systems and, more specifically, to an air induction system for introducing air into a cavity under a hull of a marine vessel.

BACKGROUND OF THE INVENTION

The demand for high-speed marine vessels in commercial and military marketplaces continues to build and grow more complex. Driven by a market of fast ferries, offshore petroleum supply vessels, police boats, pleasure craft, and transoceanic vessels and military missions like littoral warfare, patrol craft, and high-speed sealift, a broad variety of vessels has been produced.

Many hull types specialize in certain performance characteristics. Examples are broad-beam hulls like catamarans, and SWATH hull forms, which provide stable platforms. These broad-beam hulls, however, suffer from high power requirements and limited range. Tradeoffs are the norm, and prioritization of vessel performance objectives has resulted in mission-specific optimizations. Passenger vessel technology has reached a plateau in efforts to optimize for speed and fuel efficiency in recent years. The development of wave-piercing hulls, foil assist, and improved waterjet propulsion systems has not overcome drag forces on these submerged hulls, which significantly limit maximum speed, especially in rough seas.

Hydrofoil craft development continues to suffer from a significant "power hump" that results from the combined drag of the displacement hull and foils. Additionally, the relatively narrow beam of these hydrofoil hulls results in low aspect ratio foils and a low foil-borne lift-to-drag ratio. Chosen for their speed and sea-keeping ability, modem hydrofoils are severely limited in range and payload.

The Surface Effect Ship (SES) offers a partial solution to this low-speed dilemma, because an SES operates on a low-drag cushion of air. However, existing SESs expend part of their power levitating the vessel over the water with fans. The remaining SES hull interface with the sea creates a rough and limited operating effectiveness at higher speeds, especially in rough seas. Because of ride and inefficiency, this craft is selected only for its amphibious capabilities.

Thus, in general there is an unmet need in the art to break through hull resistance limitations confronting the technology of high-speed craft. In particular, there is an unmet need in the art for more efficient high-speed hull configurations and structures that can be used, alone and in combination with other technology, such as hydrofoils, so a new performance level can be reached.

SUMMARY OF THE INVENTION

The present invention is an air induction system for introducing air under pressure into a cavity under a hull of a marine vessel. The invention converts in a controlled manner kinetic energy of water flowing under a vessel to compress air or gas and releases the air or gas into the cavity to reduce hydrodynamic drag and to maintain an equilibrium pressure to provide buoyancy. Further, the air cavity minimizes marine growth and corrosion on the hull bottom; resulting in reduced maintenance. Thus, the invention provides for more economical operation of marine vessels.

A free stream of flowing water, being relatively dense, has a total pressure greater than desired cavity air pressure at relatively low speeds. The air induction system inducts air, that is draws air, from ambient into a mixing chamber where an air-water mixture attains approximately the same total pressure as the free stream of water. At the end of the mixing chamber the air rises to the surface of the water inside the air cavity at the desired pressure. Excess air suitably escapes at the transom of the vessel. The air induction system parameters may be chosen by the designer to fill the cavity with air in a controlled manner, rather than incidentally entraining into the cavity supplemental air that is drawn from ambient air.

According to the present invention, an air induction system introduces air into a cavity under a hull of a marine vessel. The cavity is bounded by an underside of the hull, first and second sidewalls of the hull, and fore and aft planing surfaces. The air induction system includes an air inlet that is arranged to receive air at ambient pressure. A plenum is arranged to receive air from the air inlet. A fore planing surface has a trailing edge, and the fore planing surface is located toward a bow of the hull. The trailing edge and the plenum define a step having a finite height, and the step extends spanwise substantially a width of the trailing edge. The step is arranged to communicate pneumatically and hydraulically with the plenum. The step generates a first pressure that is less than ambient pressure as the marine vessel moves forwardly through water and a free stream of water moves past the step, such that air communicated from the plenum is entrainable in the free stream of water. A mixing chamber is arranged to communicate pneumatically and hydraulically with the step. The mixing chamber has a predetermined length, and the step and the mixing chamber cooperate to permit kinetic energy of the free stream of water to increase pressure of air entrained in the water as the entrained air moves along the length of the mixing chamber, such that at an aft end of the mixing chamber the entrained air exerts a second pressure that is greater than ambient pressure, and air is exhausted upwardly into the cavity under the hull.

According to another aspect of the invention, an air induction system introduces air into a plurality of cavities or cells under the hull of the marine vessel. Each cell is suitably served by a planing surface terminating in a step, a plenum to receive air or gas and a mixing chamber as previously described. According to the invention, the plurality of cavities increases lateral stability of the marine vessel and automatically trims marine vessels that are unevenlyloaded.

BRIEF DESCRIPTION OF THE DRAWINGS

The preferred and alternative embodiments of the present invention are described in detail below with reference to the following drawings.

FIG. 3 is a side view of an air induction system of the present invention;

FIG. 5A is a side view of an optional air induction system for introducing air into multiple cavities;

DETAILED DESCRIPTION OF THE INVENTION

By means of an overview, the present invention is an air induction system for introducing air under pressure into a cavity under a hull of a marine vessel. The invention converts in a controlled manner kinetic energy of water flowing under a vessel to compress air or gas and releases the air or gas into the cavity to reduce hydrodynamic drag and to maintain an equilibrium pressure to provide buoyancy.

A free stream of flowing water, being relatively dense, has a total pressure greater than desired cavity air pressure at relatively low speeds. The air induction system inducts air, that is draws air, from ambient into a mixing chamber where an air-water mixture attains approximately the same total pressure as the free stream of water. At the end of the mixing chamber, the air rises to the surface of the water inside the air cavity at the desired pressure. Excess air suitably escapes at the transom of the vessel. The air induction system parameters may be chosen by the designer to fill the cavity with air in a controlled manner, rather than incidentally entraining into the cavity supplemental air that is drawn from ambient air.

Figure 1:
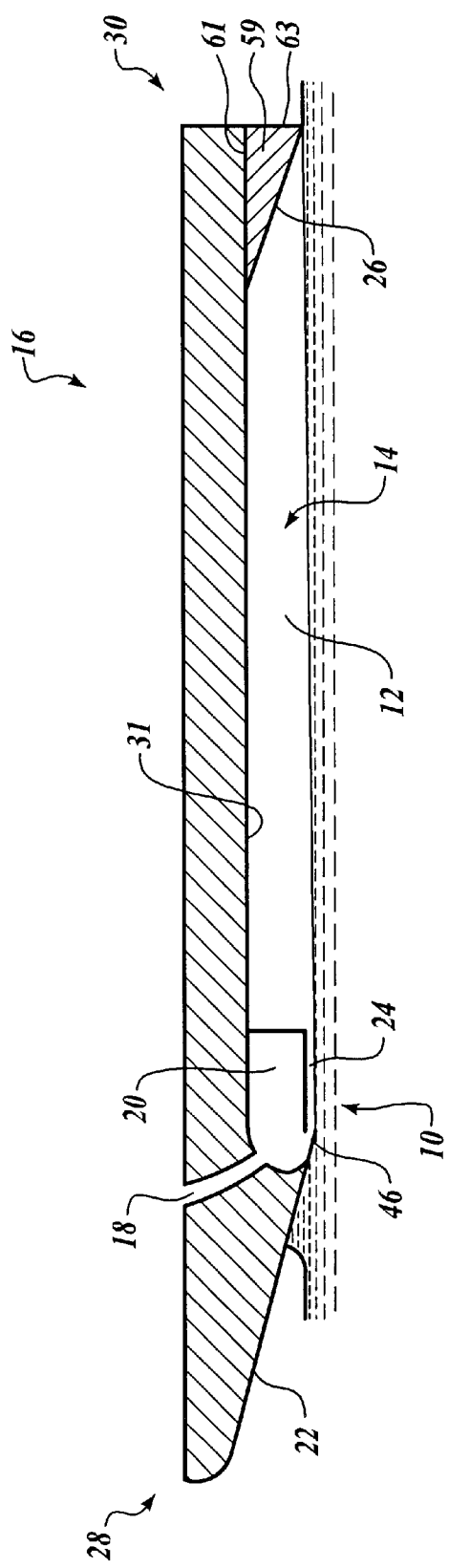
FIG. 1 is side view of a hull of a marine vessel that includes an air induction system of the present invention.

Referring now to FIG. 1, an air induction system 10 is provided for introducing air into a cavity 12 under a hull 14 of a marine vessel 16. The cavity 12 occupies a volume enclosed by an underside 31 and sidewalls 32 of the hull 14, and by fore and aft planing surfaces 22 and 26. An air inlet 18 receives air at ambient pressure. A plenum 20 receives air from the air inlet 18 and the plenum 20 suitably extends spanwise substantially a width of the hull 14 of the marine vessel 16. The fore planing surface 22 and the plenum 20 define a step having a finite height, and the step extends spanwise substantially a width of the trailing edge. The step communicates pneumatically and hydraulically with the plenum 20. The step generates a first pressure that is less than ambient pressure as the marine vessel 16 moves forwardly through water and a free stream of water moves past the step, such that air communicated from the plenum 20 is entrainable in the free stream of water. A mixing chamber 24 has a predetermined length and suitably incorporates vortex generators (not shown) or other acceptable devices to promote entrainment. The step and the mixing chamber 24 cooperate to permit kinetic energy of the free stream of water to increase pressure of air entrained in the water as the entrained air/water mixture moves along the length of the mixing chamber 24, such that the entrained air/water mixture seals the exit of the mixing chamber 24. This prevents the pressure of the cavity 12 from escaping back to the plenum 20. At the aft end of the mixing chamber 24, the pressure of the entrained air exerts a second pressure, that is greater than ambient pressure, to maintain an equilibrium pressure to provide buoyancy. Air exhausts upwardly and is introduced into the cavity 12. Air is sealed within the cavity 12, but excess air suitably escapes past the stern of the marine vessel 16.

The marine vessel 16 is suitably any marine vessel. As such, the marine vessel 16 may include its own power plant. In this case, the marine vessel 16 may be any type of powered marine vessel, such as without limitation a ferry boat, a transoceanic cargo vessel, a pleasure craft, a catamaran, or a suitable military marine vessel. On the other hand, the marine vessel 16 is also suitably a marine vessel that does not include its own power plant, such as a barge. Non-limiting examples of suitable marine vessels 16 incorporating the invention are discussed later after the air induction system 10 has been described.

Figure 2A:
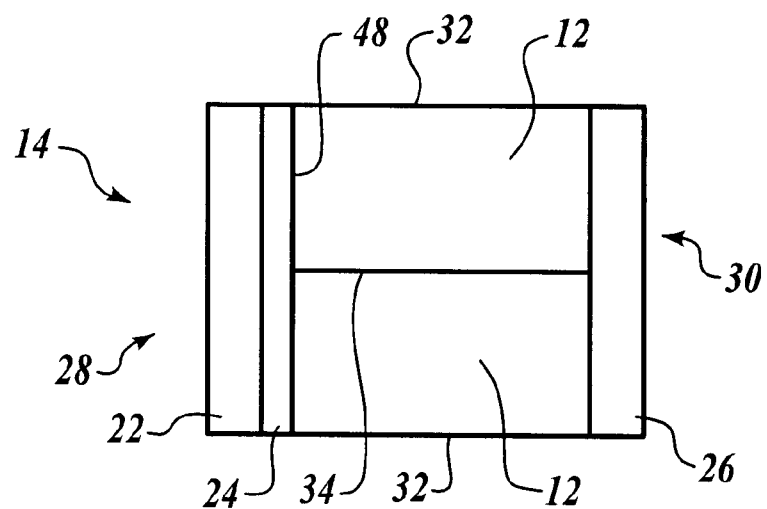
FIGS. 2A and 2B are plan views of the underside of hulls of marine vessels showing multiple cavities.
Figure 2B:
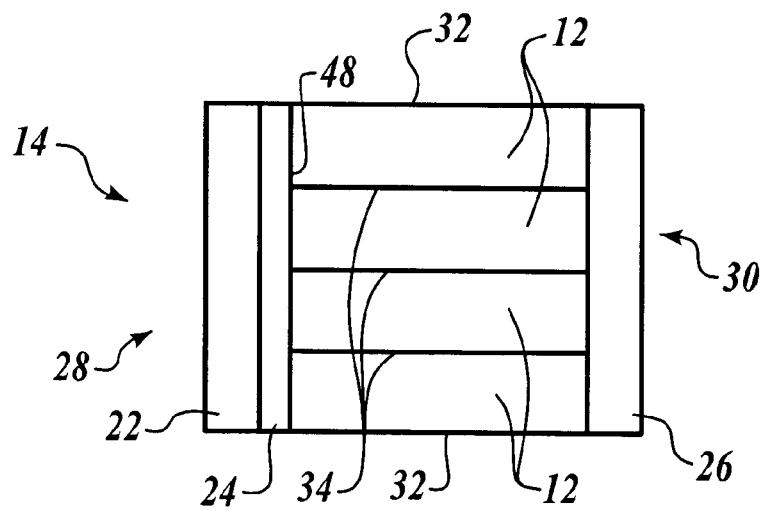

Referring now to FIGS. 1, 2A, and 2B, the hull 14 represents a generic hull and includes a bow 28, a stern 30, and an underside 31. Referring now to FIGS. 2A and 2B, the hull 14 is shown in plan view looking toward the bottom of the hull 14. As seen in FIG. 2A, the hull 14 includes sidewalls 32 that extend longitudinally from the bow 28 to the stern 30. The sidewalls 32 extend downward past a water line (not shown) of the marine vessel 16 when the marine vessel 16 is operating at maximum speed. A longitudinal wall 34 divides the cavity 12 into two lateral cells to provide lateral stability. The longitudinal wall 34 is substantially parallel to the sidewalls 32, and may or may not extend downward past the water line (not shown) when the marine vessel 16 is operating at maximum speed.

It will be appreciated that the cavity 12 is the volume bounded by the sidewalls 32, the fore and aft planing surfaces 22 and 26, the underside 31, and the surface of the water on which the marine vessel 16 is supported. At least two cells of the cavities 12 are formed, with the longitudinal wall 34 forming a boundary between the two cells. Referring now to FIG. 2B, a plurality of the cavities 12 that extend substantially from the bow 28 toward the stern 30 are formed, if desired, by providing a plurality of longitudinal walls 34. It will be appreciated that increasing the number of longitudinal walls 34 provides increased lateral stability for the marine vessel 16. It will be appreciated that the cavity 12 (or the plurality of cavities 12) may be provided for any type of marine vessel incorporating any hull design, as desired.

Referring now to FIGS. 1, 2A and B, and 3, components of the air induction system 10 will now be discussed. The air inlet 18 is arranged to receive air at ambient pressure. The air inlet 18 suitably includes a duct 36 with a first end 38 and a second end 40. The first end 38 is exposed to ambient air and other gasses as desired, such as cabin ventilation air and engine exhaust, and the second end 40 is connected to the plenum 20. The duct 36 is suitably any duct, or header, or pipe, or conduit, or the like, that is suitably arranged to pneumatically communicate air therethrough from ambient to the plenum 20. As such, it will be appreciated that it is desirable that the duct 36 present as straight and direct a path as possible between ambient air and the plenum 20. However, it will be appreciated that the duct 36 may take any shape as desired or required. For example, the duct 36 may take a torturous path between ambient air and the plenum 20 in order for the duct 36 to avoid interference from structural members of the hull 14 or any other items of interference that may be present.

The plenum 20 is arranged to receive air from the air inlet 18 and distribute the received air. The plenum 20 includes an inlet 42 to which the duct 36 is attached at the second end 40. However, it will be appreciated that in alternate embodiments, the inlet 42 suitably functions as the air inlet 18. That is, in such an alternate embodiment, the inlet 42 is exposed to ambient air, and the duct 36 is suitably not provided. The plenum 20 suitably extends spanwise substantially the width of the hull 14. Alternately, the plenum 20 expands spanwise the width of air cavities 12 to be served by the plenum 20 (see FIGS. 2A and 2B). The plenum 20 includes an outlet 44. The outlet 44 is arranged to pneumatically communicate air distributed by the plenum 20 to a free stream of water flowing under the hull 14. It will be appreciated that the plenum 20 may take any shape as desired or required by construction of the hull 14, such that the plenum 20 provides a suitable volume for receiving air from the air inlet 18, distributing the air spanwise, and pneumatically communicating the air to the free stream of water flowing under the hull 14. While a substantially rectangular cross section is shown by way of non-limiting example, from the foregoing discussion it will be appreciated that the plenum 20 is not limited to such a substantially rectangular shape but may take any shape as desired.

The fore planing surface 22 extends spanwise the width of the hull 14 or cavities 12, toward the bow 28, and extends aft from a forward end of the bow 28 at a downward angle toward the water. The fore planing surface 22 includes an aft end 46 that is located toward the outlet 44 of the plenum 20, such that the fore planing surface 22 terminates at its aft end 46 near the outlet 44 of the plenum 20. It will be appreciated that the fore planing surface 22 is a hydrodynamic element of the hull 14. In one presently preferred, non-limiting example, the fore planing surface 22 is optimized with an angle of attack of about 4 degrees. However, it will be appreciated that other angles of attack may be used as desired for a particular application.

The fore planing surface 22 thus provides a hydrodynamic element with a high aspect ratio. That is, the aspect ratio of the fore planing surface 22 is greater than one. In one presently preferred embodiment, the aspect ratio of the fore planing surface is greater than about two. As is known, as aspect ratio is increased, hydrodynamic drag coefficient is reduced. It will be further appreciated that as speed of the marine vessel 16 increases, the fore planing surface 22 is lifted further out of the water, and aspect ratio of the fore planing surface 22 is further increased. This results in even further reduction in hydrodynamic drag. As a result, the aspect ratio of the fore planing surface 22 advantageously may reach values in the range of around 10–15 or more, depending on angle of attack of the fore planing surface 22 and speed of the marine vessel 16. When the hull is fitted with hydrofoils the aspect ratio becomes infinite as the hull lifts out of the water.

At the aft end 46, the fore planing surface 22 defines a trailing edge 48 that extends the width of the fore planing surface 22. The trailing edge 48 of the fore planing surface 22 and the outlet 44 of the plenum 20 are arranged such that a step 50 or gap is defined above the trailing edge 48 of the fore planing surface 22. The step 50 has a finite height related to the quantity of air to replenish the cavity 12.

According to a presently preferred embodiment, the mixing chamber, 24 includes a substantially horizontal member 52 that extends aft from the outlet 44 of the plenum 20. The horizontal member 52 has a first end 54 located toward the outlet 44 of the plenum 20 and a second end 56. The horizontal member 52 defines a predetermined length l, which is advantageously selected as the distance for the entrained air/water mixture to be fully in contact with the horizontal member 52 between the first end 54 and the second end 56. This contact provides a seal to prevent air in the cavity 12 from flowing back to the plenum 20. A connecting member 58 is attached to the horizontal member 52 at the second end 56 and is attached to the underside 31 of the hull 14. The connecting member 58 advantageously provides a forward boundary for the cavity 12. The connecting member 58 is suitably interposed between the underside 31 of the hull 14 and the second end 56 of the horizontal member 52 in a substantially vertical manner. However, it will be appreciated that the connecting member 58 may take any shape and may be interposed between the underside 31 of the hull 14 and the horizontal member 52 in any manner. For example, it may be desirable to orient the connecting member other than substantially vertically in order to avoid interference with structural members of the hull 14. It will also be appreciated that the horizontal member 52 and the connecting member 58 may define boundaries of the plenum 20. However, this is not necessary for the invention. In alternate embodiments of the invention, the plenum 20 and the mixing chamber 24 do not share any structural members in common. However, it will be appreciated that, if desired, use of common structural components between the mixing chamber 24 and the plenum 20 reduces weight by minimizing structural components used in the air induction system 10.

The aft planing surface 26 provides an after sealing surface to maintain air sealed within the cavity 12. The aft planing surface 26 is suitably a wedge-shaped, hydrodynamically-designed member 59 that is located toward the stern 30. In a presently preferred embodiment, the member 59 includes a first surface 61 mounted on the underside 31 of the hull 14 and a second surface 63 suitably substantially normal to the first surface 61 and substantially flush with the stern 30, such as a transom. The aft planing surface 26 is suitably a hypotenuse interposed between the first surface 61 and the second surface 63 in the wedge-shaped embodiment of the member 59. It will be appreciated that the aft planing surface 26 is suitably presented in any structural arrangement, such that the aft planing surface 26 extends downwardly from the underside 31 of the hull 14 toward or past the water line when the marine vessel 16 operates at maximum speed.

Figure 4A:
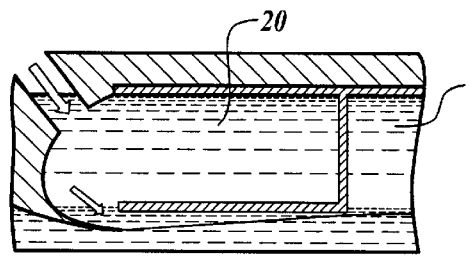
FIGS. 4A–4G show the air induction system of the present invention at various stages of pressurization.
Figure 4B:
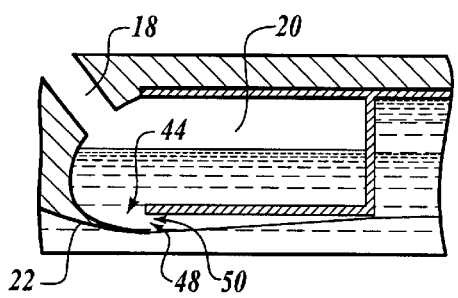

The air induction system 10 operates as follows. Referring now to FIG. 4A, the marine vessel 16 is at rest in the water at velocity $v_0$. The marine vessel 16 is supported in the water by displacement of the hull 14. The cavity 12 and the plenum 20 are flooded with water. Referring now to FIG. 4B, the marine vessel moves forwardly through the water at a velocity $v_1$ ($v_1 > v_0$). At $v_1$, the marine vessel 16 is supported in the water by displacement of the hull 14. At $v_1$, water flows past the fore planing surface 22 as the marine vessel 16 moves forwardly through the water. As water moves past the trailing edge 50 of the fore planing surface 22, a negative pressure, that is pressure less than ambient air pressure, is generated in the area behind the step 50. Thus, water in the plenum 20 is subject to ambient air pressure via the air inlet 18 and is exposed to a pressure less than ambient air pressure via the outlet 44 of the plenum 20. Therefore, water in the plenum 20 flows from the area of higher, ambient air pressure to the area of lower pressure. As a result, water is drawn from the plenum 20 through the outlet 44.

Figure 4C:
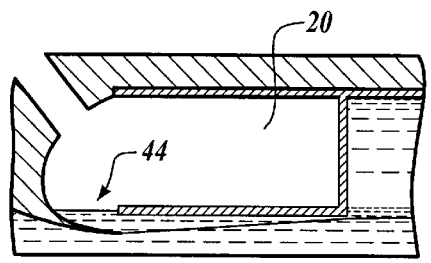

Referring now to FIG. 4C, the marine vessel 16 moves forwardly through the water at a velocity $v_2$ ($v_2 > v_1$). As described above, water in the plenum 20 continues to be drawn out the outlet 44. Eventually, water completely drains from the plenum 20, and the plenum 20 is filled completely with air.

Figure 4D:
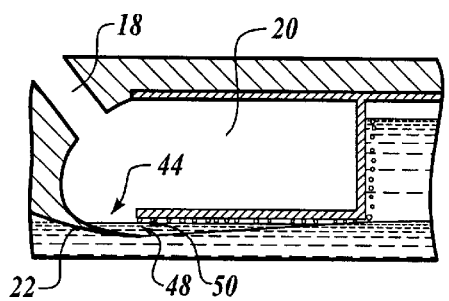

Referring now to FIG. 4D, the marine vessel 16 moves forwardly at a velocity $v_3(v_3>v_2)$. At this point, the plenum 20 has been completely emptied of water and is filled with air that has been received via the air inlet 18. As discussed above, as water moves past the trailing edge 48 of the fore planing surface 22, a negative pressure (that is, pressure less than ambient air pressure) is generated behind the step 50. As a result, air is drawn from ambient through the air inlet 18, into the plenum 20, and out of the plenum through the outlet 44 through the step 50. The air exiting from the outlet 44 of the plenum 20 is entrained in the free stream of water flowing past the fore planing surface 22.

Figure 4E:
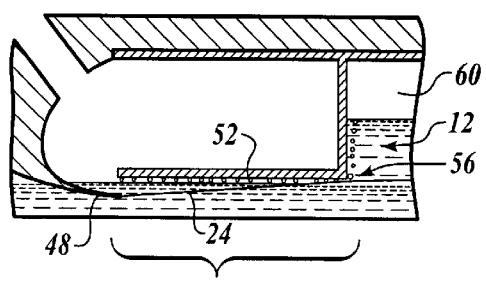

Referring now to FIG. 4E, the water-entrained air mixture flows aft from the trailing edge 48 through the mixing chamber 24 along the length l of the horizontal member 52. As the water-entrained air mixture moves along the mixing chamber 24, air bubbles in the water-entrained air mixture exhaust upwardly and are stopped in their upward movement by the horizontal member 52. Therefore, as the water-entrained air mixture moves aft from the trailing edge 48, the water-entrained air mixture encounters pressure communicated from the cavity 12. Thus, as the water-entrained air mixture moves aft along the mixing chamber 24, the velocity of the water-entrained air mixture is decreased. As is known, as the velocity of the water-entrained air mixture decreases, the loss in kinetic energy results in an increase of the static pressure of the air in the water-entrained air mixture, as given by the following equation.

$$P_f = P_i + \frac{1}{2}\rho(v_i^2 - v_f^2) \quad (1)$$

where:
$P_f$=Pressure available at aft end of mixing chamber;
$P_i$=Pressure at forward end of mixing chamber;
$\rho$=constant;
$v_i$=velocity at forward end of mixing chamber; and
$v_f$=velocity at aft end of mixing chamber.

The available pressure $P_f$ at the second end 56 thus approaches the velocity head of the free flow of water under the marine vessel 16. It will be appreciated that the longer the length l, the greater the distance for the air/water mixture to be fully in contact with the horizontal member 52, the greater the amount of mixing, and therefore the greater the increase in pressure from $P_i$ to $P_f$. Thus the length l may be selected such that, at normal operating speeds for the marine vessel 16, the pressure $P_f$ is greater than ambient pressure and maintains an equilibrium pressure to provide buoyancy. The height h of the step 50 is related to the quantity of air required by the cavity 12. Thus, as the height h of the step 50 is increased, the length l must also be increased in order for the air/water mixture to be fully in contact with the horizontal member 52 between the first end 54 and the second end 56. This contact provides a seal to prevent air in the cavity 12 from flowing back to the plenum 20. As a result, when the water-entrained air mixture flows past the second end 56, the air is exhausted upwardly into the cavity 12. Because the pressure $P_f$ of the air in the cavity 12 is greater than ambient pressure, the air at pressure $P_f$ displaces the water from the cavity 12 and forms an air bubble 60.

Figure 4F:
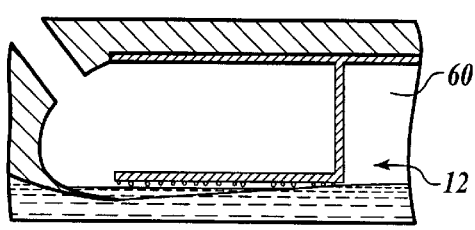

Referring now to FIG. 4F, the cavity 12 is completely filled by the air bubble 60. Because the marine vessel 16 is moving forwardly through the water at speed $v_3$, the air bubble 60 continuously fills the cavity 12 with air at pressure $P_f$. Thus, if air from the air bubble 60 escapes the cavity 12, such as by exiting past the stern 30, the air induction system 10 continuously introduces air into the cavity 12 as described above. Thus, the air induction system 10 maintains and replenishes the air bubble 60 in the cavity 12 while the marine vessel 16 moves forwardly through the water.

Figure 4G:
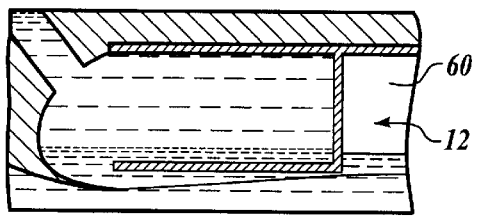

Referring now to FIG. 4G, the marine vessel 16 is not moving through the water. As speed of the marine vessel 16 is reduced, the velocity head of the flow under the marine vessel 16 will be less than the pressure exerted by the air bubble 60 in the cavity 12. As a result, water will rise in the cavity 12, compressing the air bubble 60 until equilibrium is reached. Advantageously, the air bubble 60 is sealed within the cavity 12 as long as the cavity 12 remains air-tight. The plenum 20 will fill with water to the static water line of the marine vessel 16.

Referring now to FIG. 5A, another embodiment of the present invention includes an air induction system 110 for introducing air into a plurality of cavities 112 under a hull (not shown) of a marine vessel (not shown).

An air inlet 118 is arranged to receive air at ambient pressure. The air inlet 118 may be a stand-alone air inlet that is dedicated to the air induction system, or the air inlet 118 may be incorporated with an air inlet for a power plant 119, such as a turbine, a diesel engine, an internal combustion engine, or the like. Regardless of whether the air inlet 118 is a stand-alone unit or is incorporated into an air inlet for the power plant 119, the air inlet 118 includes a common supply duct 136. The common supply duct 136 supplies air at ambient pressure to a plurality of headers 137. It will be appreciated that the common supply duct 136 should be located above the static water line of the marine vessel.

When the air inlet 118 is incorporated into an air inlet for the power plant 119, supplemental air, such as engine bleed air or exhaust from the power plant 119, may be introduced to the cavities 112. The common supply duct 136 includes a valve 139 that has a port connected to the common supply duct 136 and another port connected to a bleed air duct 141 from the power plant 119. The valve may be any type of valve suitable for use in air ducts, such as without limitation a flapper valve. The valve 139 may be controlled and actuated as desired. For example, the valve 139 may be manually controlled. If desired, the valve 139 may be remotely controlled by a solenoid (not shown) and actuated with a motor (not shown), such as an electric motor, a hydraulic actuator, or a pneumatic actuator.

If desired, when the valve 139 is controlled by a solenoid, the solenoid may be energized in response to a control signal from a pressure sensor 145 located in one of the cavities 112. For example, if desired, the pressure sensor 145 may be located in one of the cavities 112 located toward the stern of the marine vessel. The pressure sensor is suitably any acceptable pressure sensor known in the art. When pressure sensed by the pressure sensor 145 decreases below a predetermined setpoint pressure, the pressure sensor 145 energizes the solenoid which, in turn, opens the valve 139. This ports supplemental air from the power plant 119 through the headers 137 to the cavities 112. This raises the pressure in the cavities 112 to a pressure that is greater than the setpoint pressure of the pressure sensor 145. The pressure sensor 145 resets at a reset pressure that is higher than the set point pressure and causes the solenoid to be de-energized. This shuts the valve 139, and bleed air is no longer ported to the cavities 112 from the power plant 119.

A check valve 143 is installed in the common supply duct between the air inlet 118 and the header 137 closest to the air inlet 118. The check valve 143 is arranged to permit air to flow from the air inlet 118 to the plurality of headers 137 but to prevent back-flow of air into the air inlet 118. The check valve 143 may be any type of check valve suitable for air systems. If desired, the check valve 143 may include an over-pressure relief port (not shown) to prevent over-pressurization of the duct 136 and the headers 137 from bleed air supplied by the power plant 119.

Figure 5B:
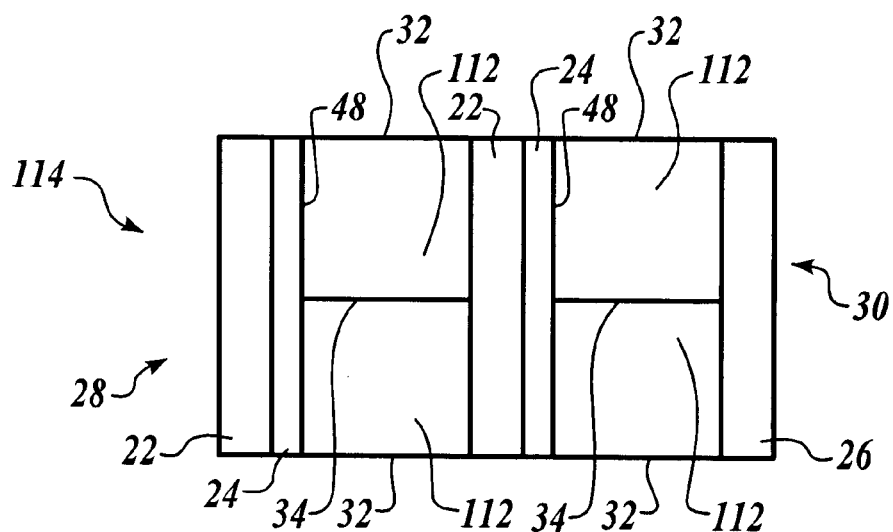
FIGS. 5B and 5C are plan views of an underside of a hull of a marine vessel showing multiple cavities into which air is introduced by the system shown in FIG. 5A.
Figure 5C:
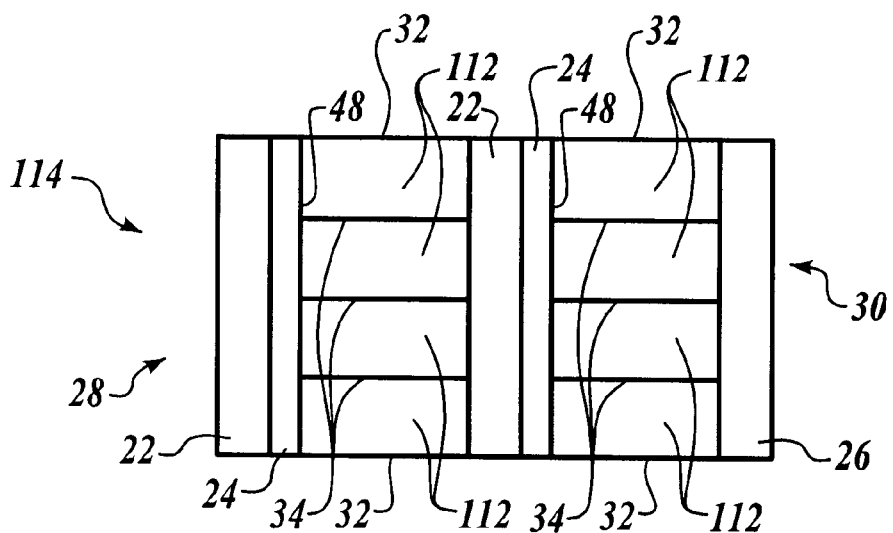

Referring now to FIG. 5B, a hull 114 with a plurality of the cavities 112 is shown in plan view toward the bottom of the hull 114. The hull 114 of FIG. 5B is similar to the hull 14 (FIG. 2A). However, the hull 114 includes the air induction system 110 (FIG. 5A) and a plurality of the plenums 20, fore planing surfaces 22, and mixing chambers 24 as described above. FIG. 5C shows the hull 114 with a plurality of the longitudinal walls 34 as described above. This forms a plurality of lateral cavities 112 as discussed above for FIG. 2B. Alternately, the planing surface intermediate the fore planing surface 22 and the aft planing surface 26 may be similar to the aft planing surface such that the intermediate planing surface suitably does not communicate hydraulically or pneumatically with any plenum. Instead, the cavity 112 aft of the intermediate planing surface is suitably pressurized by air escaping aft from the cavity 112 that is forward of the intermediate planing surface past the intermediate planing surface.

Figure 6:
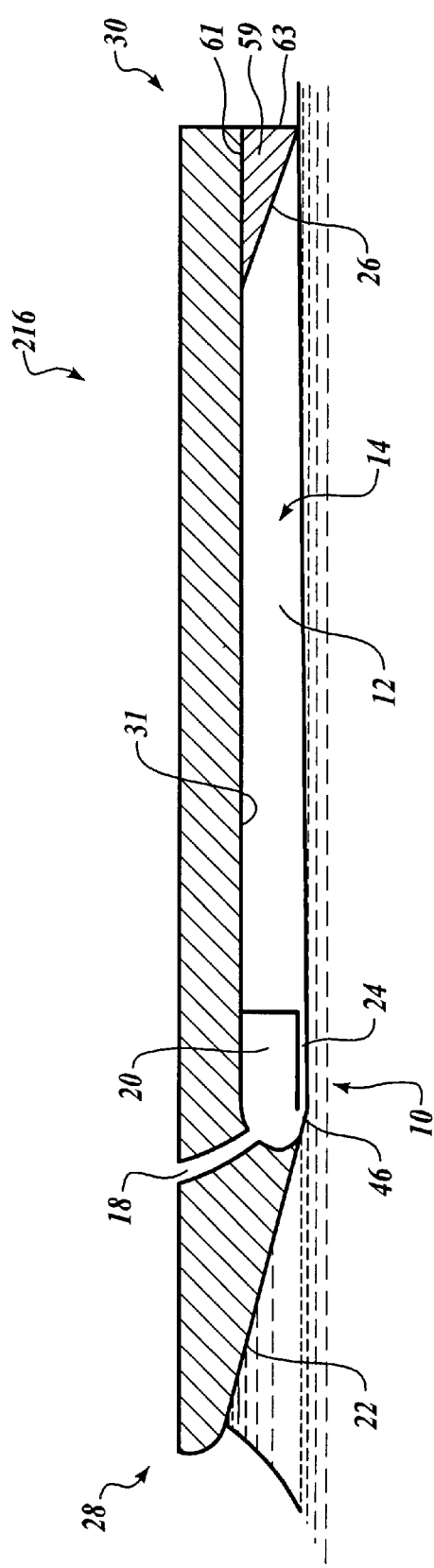
FIG. 6 is a side view of a barge incorporating the air induction system of the invention.

The present invention may be advantageously incorporated in a variety of marine vessels as shown in the non-limiting examples shown in FIGS. 6–16. Moreover, the present invention may be used in a marine vessel without a power plant and in a marine vessel with its own power plant. For example, FIG. 6 shows a side view of a barge 216 that includes the air induction system 10 (FIGS. 1 and 3) and the hull 14 (FIG. 1). The barge 216 suitably includes multiple cavities 12, if desired, as shown in FIGS. 2A and B. It will be appreciated that equilibrium pressures in the multiple cavities 12 automatically trim the barge in the event of uneven loading. By providing an air bubble in the cavity or cavities 12 of the barge 216, drag on the barge 216 is greatly reduced and results in economical operation of up-stream towing on fast rivers. This greatly reduces power requirements on a tug (not shown) towing the barge 216 behind or alongside or pushing the barge 216 ahead as a composite unit. The air cavity 12 also minimizes marine growth and corrosion on the hull bottom, resulting in reduced maintenance.

Figure 7:
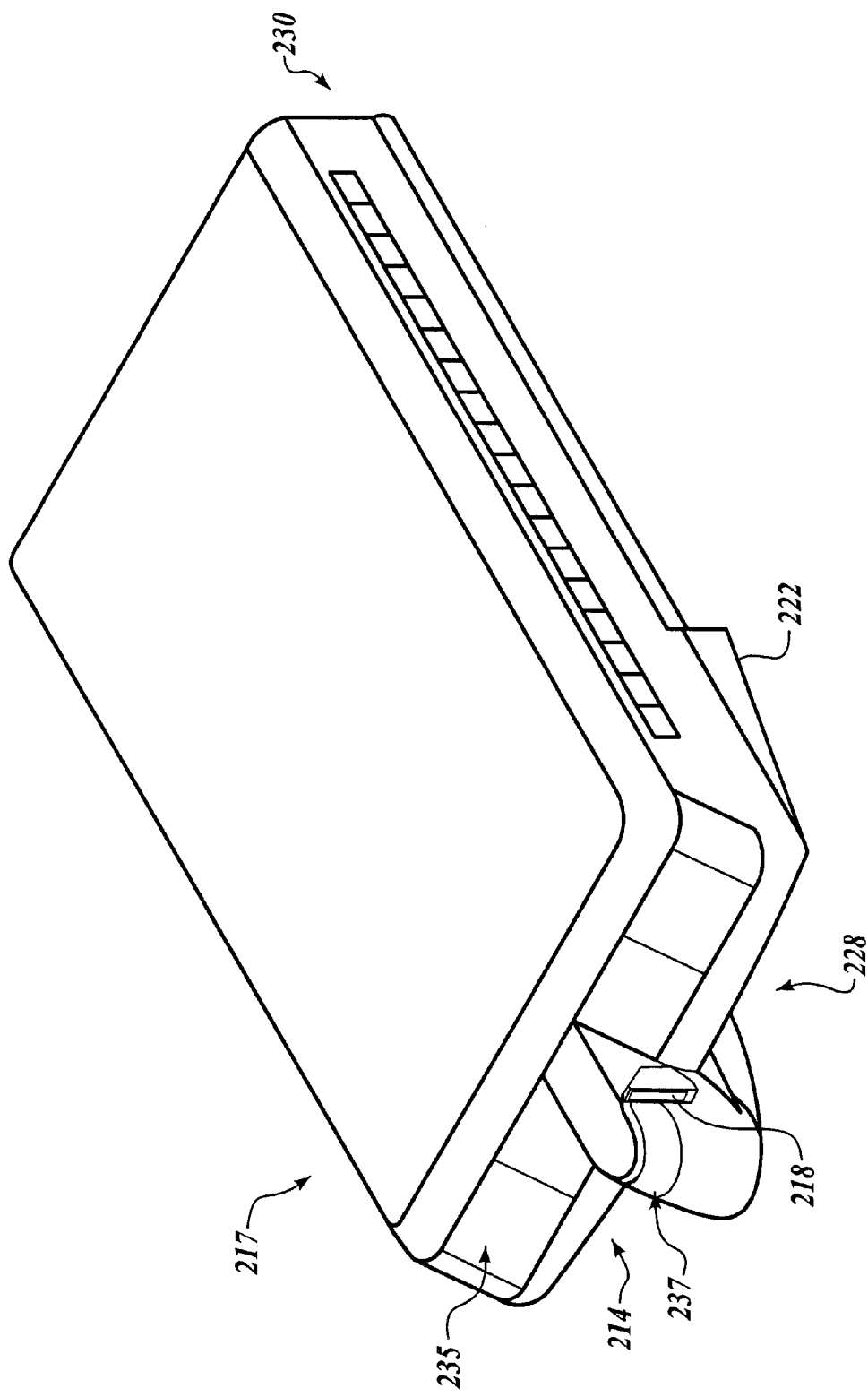
FIG. 7 is a perspective view of a powered marine vessel incorporating the air induction system of the present invention.
Figure 8:
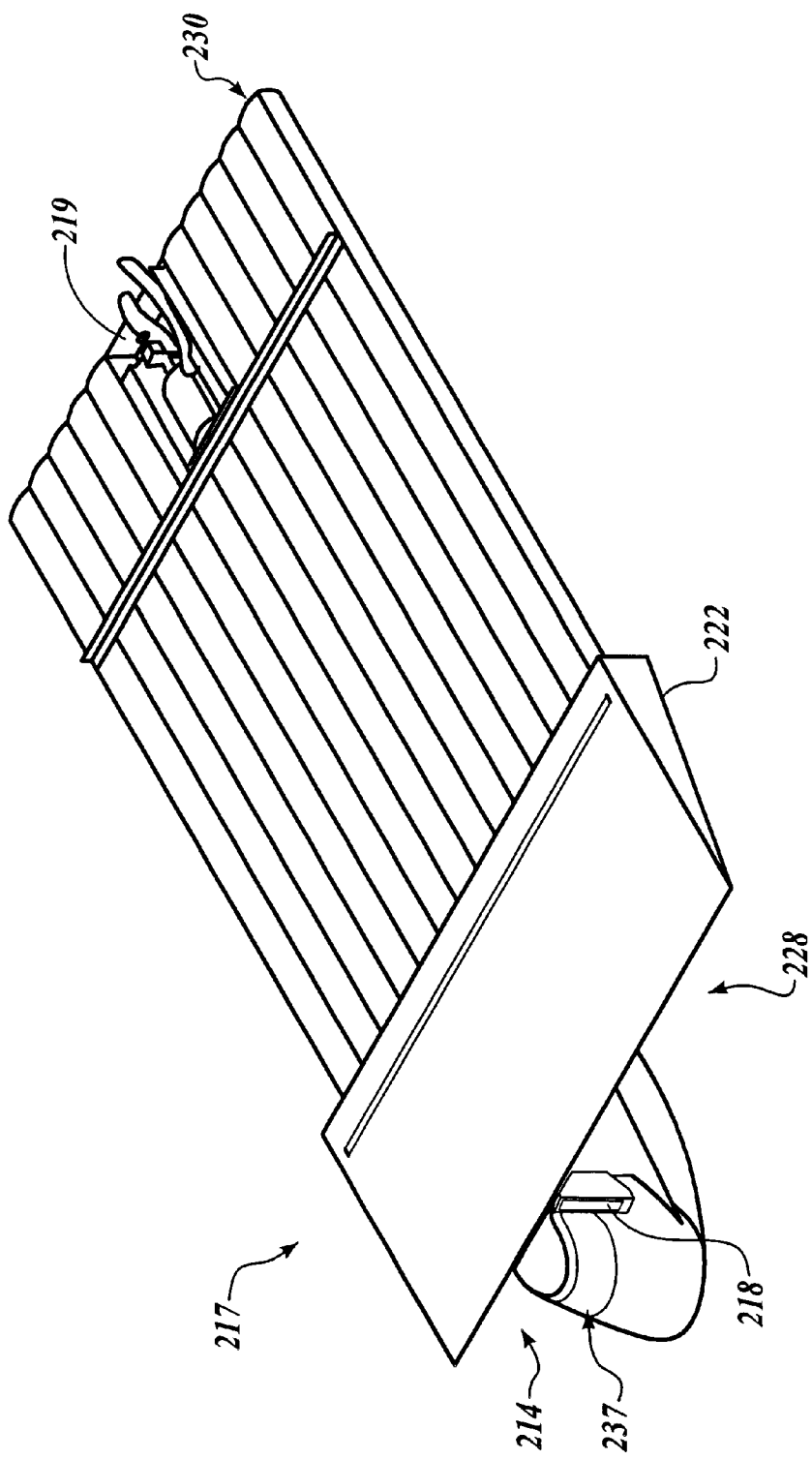
FIG. 8 is a partial cutaway perspective view of the basic hull of the marine vessel of FIG. 7 or other configurations.
Figure 9:
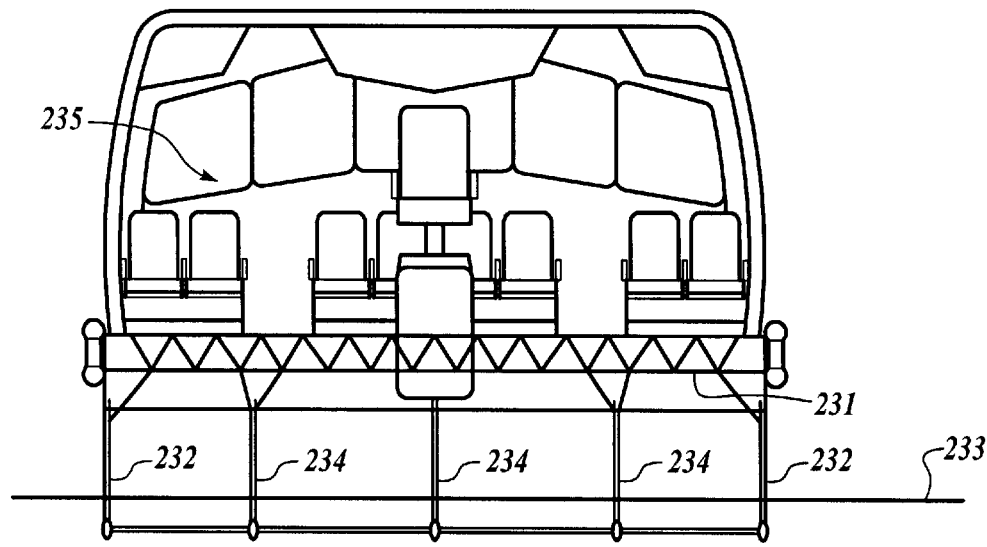
FIG. 9 is a front view of the marine vessel of FIG. 7.

FIGS. 7, 8, and 9 show a powered marine vessel 217, such as without limitation a ferry boat. However, it will be appreciated that the powered marine vessel 217 may be any type of powered marine vessel and that a ferry boat is given by way of non-limiting example. Referring now to FIGS. 7, 8, and 9, the boat 217 includes a hull 214 with a bow 228, a stern 230, and an underside 231. The hull 214 includes sidewalls 232 that extend longitudinally from the bow 228 to the stern 230. The sidewalls extend downward past a water line 233 of the boat 217 when the boat 217 is operating at maximum speed. A plurality of longitudinal walls 234 are provided to increase lateral stability. The boat 217 also includes a cabin 235, a pilot house 237, a fore planing surface 222, an air inlet 218, and a power plant 219.

Figure 10:
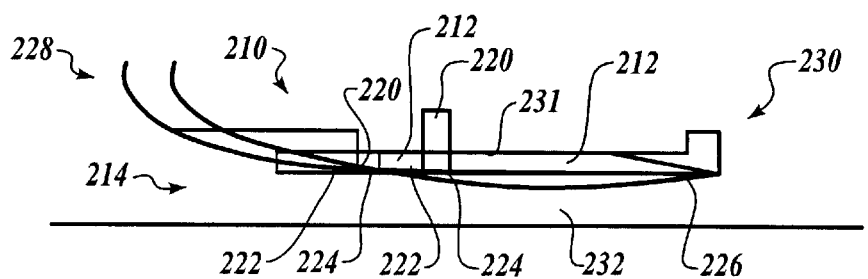
FIG. 10 is a side view of the hull of the marine vessel of FIG. 7.
Figure 11:
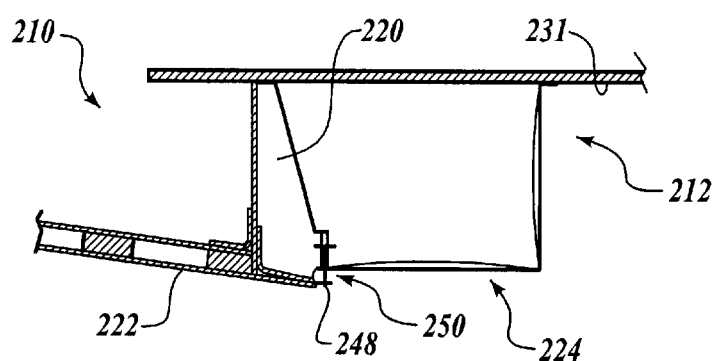
FIG. 11 is a side view of details of the hull of FIG. 10.

FIG. 10 shows a side view of the hull 214, and FIG. 11 shows a side view of details of the invention. Referring now to FIGS. 7–11, the boat 217 includes an air induction system 210 for introducing air into a plurality of cavities 212 under the hull 214. The air inlet 218 receives air at ambient pressure, and a plurality of plenums 220 receive air from the air inlet 218. Each of a plurality of the fore planing surfaces 222 define a trailing edge 248 and a step 250. A plurality of mixing chambers 224 are provided, and an aft planing surface 226 is positioned near the stern 230 to seal air in the cavity 212 located toward the stern 230. It will be appreciated that the air induction system 210 is similar to the air induction system 110 (FIG. 5A), and, as such, supplemental air from the power plant 219 may be introduced into the cavities 212 as desired.

Figure 12:
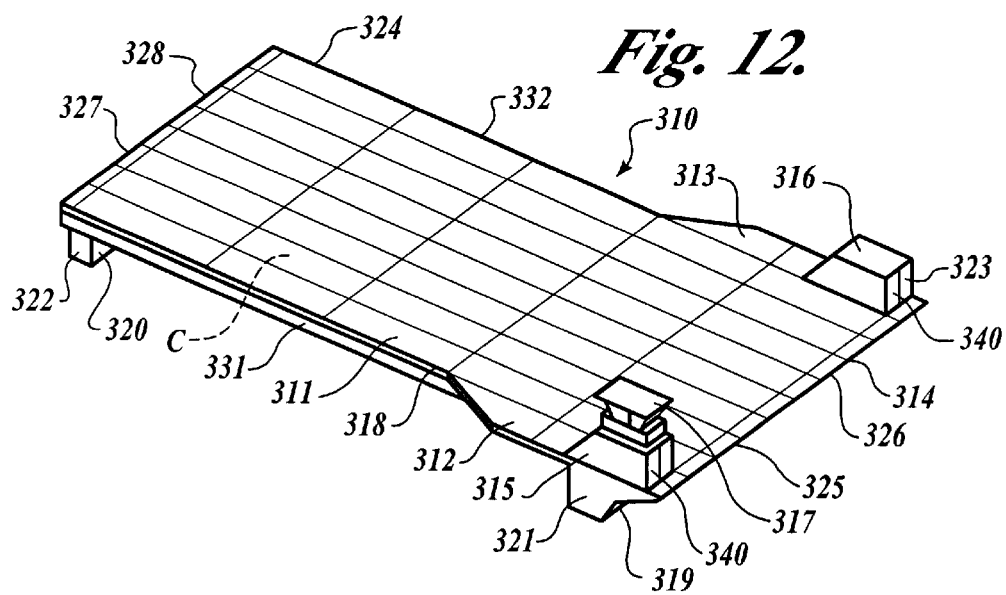
FIG. 12 a perspective view of a marine vessel incorporating the air induction system of the present invention.
Figure 13:
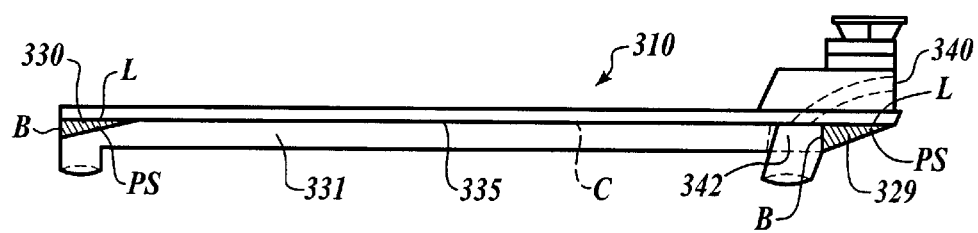
FIG. 13 is a side view of the marine vessel of FIG. 12.
Figure 14:
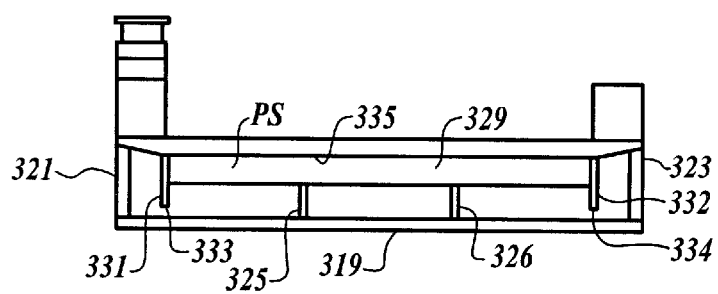
FIG. 14 end view of the marine vessel of FIG. 12.

FIGS. 12–14 show a marine vessel that incorporates the air induction system of the present invention. FIGS. 12–14 show a boat as shown in FIGS. 1–3 of my issued U.S. Pat. Nos. 5,651,327 and 5,860,383, both of which are hereby incorporated by reference, but further modified to incorporate the present invention. As shown in FIG. 12 the boat 310 has a rectangular basic deck 311 having extended portions or wings 312 and 313 near bow 314. Housings 315 and 316 cover the power plants and control cabin 317 is supported by housing 315. When the boat is at rest it is supported by buoyant displacement of the hull 318 and strut supported hydrofoils 319 and 320 along with air trapped under the hull (air cushion). The hydrofoils 319 and 320 are attached to the hull by struts 321 and 322, respectively, similar struts 323 and 324 on the other side of the hull, respectively, and intermediate struts 325, 326, 327, and 328, respectively. Struts 321, 323, 325, and 326 can be seen in FIG. 14.

FIG. 13 is a side view of boat 310. The shaded areas show the cross section size, shape and location of skirts 329 and 330 which extend the full width of the hull between sidewall 331 and sidewall 332, see also FIG. 14. In an alternate embodiment of the subject invention, skirt 330 may be of flexible construction. Skirts 329 and 330 are preferably disposed at an angle between parallel and perpendicular with respect to the horizontal surface of the water to provide at least partial support of hull 318 when boat 310 travels at low and intermediate speeds. Each of skirts 329 have a cross sectional shape preferably defining a substantially right triangle with leg L being substantially parallel to the longitudinal axis of hull 318, with base B being substantially perpendicular to the longitudinal axis of hull 318 such that leg L and base B form a substantially right angle. Thus, planing surface PS is the hypotenuse of the cross sectional triangle formed by the planing surface PS, base B, and leg L. Planing surfaces PS of skirts 329 and 330 are thus preferably disposed at an angle between parallel and perpendicular with respect to the horizontal surface of the water to provide at least partial support of hull 318 when boat 310 travels at low and intermediate speeds.

FIG. 14 is a view of boat 310 from the bow 314. Struts 321, 323, 325, and 326, skirt 329, foil 319, and sidewalls 331 and 332 are visible. As shown, foil 319 may extend beyond the sidewalls 331 and 332 and be attached to extended portions of wings 312 and 313. When the boat is initially under way the lower edges 333 and 334 of the sidewall 331 and sidewall 332, respectively, are immersed in the water. The boat 310 planes on the skirts 329 and 330, and on a quantity of air termed a bubble enclosed in a cavity C bounded by the water surface, by the dams, by the sidewall 331 and sidewall 332, and by underside 335 of the hull 318. Most preferably, central wall 335a is longitudinally disposed on underside 335 of hull 318 to longitudinally bisect cavity C to form two air bubbles to support boat 310.

The boat 310 includes an air inlet 340 and a plenum 342, shown in phantom in FIG. 13 and arranged to receive air from the air inlet 340. The dams 329 and 330 are fore and aft planing surfaces, respectively. The dam 329 defines a trailing edge (now shown) and the dam 329 and the plenum 342 define a step (not shown) as set forth above.

Figure 15:
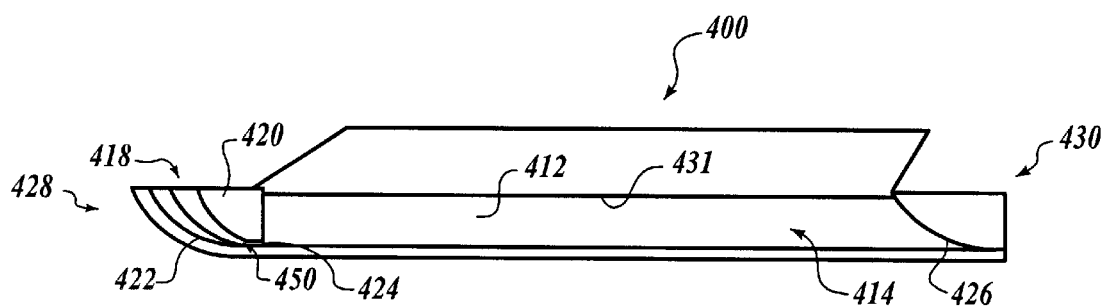
FIG. 15 is a side view of a catamaran incorporating the air induction system of the present invention.
Figure 16:
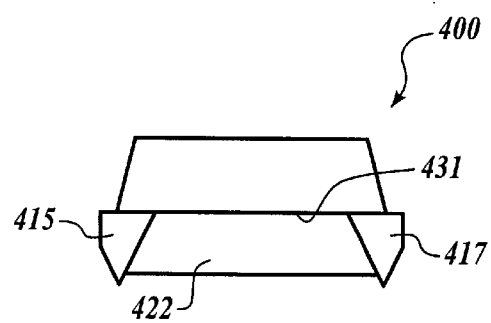
FIG. 16 is an end view of the catamaran of FIG. 15.

FIGS. 15 and 16 shown a catamaran 400 that incorporates the air induction system of the present invention. The catamaran includes a hull 414 with a bow 428, a stern 430, and an underside 431. The hull 414 includes first and second hulls 415 and 417.

According to the invention, the catamaran 400 also includes a fore planing surface 422, an air inlet 418, a plenum 420, a mixing chamber 424, and an aft planing surface 426. The fore and aft planing surfaces 422 and 426, the first and second hulls 415 and 417, and the underside 431 define a cavity 412. The fore planing surface 422 defines a trailing edge (not shown), and the fore planing surface 422 and the plenum 420 define a step 450. Details regarding the aforementioned features and operation to introduce air into the cavity 412 are as set forth above.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. An air induction system for introducing air into a cavity under a hull of a marine vessel, the hull having an underside and first and second sidewalls and fore planing surface located toward a bow of the hull and an aft planing surface located toward a stern of the hull, the cavity being a volume bounded by the underside and the first and second sidewalls and the fore and aft planing surfaces, the system comprising:

an air inlet arranged to receive air at ambient air pressure;

a plenum arranged to receive air from the air inlet;

a fore planing surface having a trailing edge, the fore planing surface being located toward a bow of the hull, the trailing edge and the plenum defining a step having a finite height and extending spanwise substantially a width of the trailing edge, the step being arranged to communicate pneumatically and hydraulically with the plenum, the step being arranged to generate a first pressure that is less than ambient pressure as the marine vessel moves forwardly through water and a free stream of water moves past the step, such that air communicated from the plenum is entrainable in the free stream of water; and a mixing chamber arranged to communicate pneumatically and hydraulically with the step, the mixing chamber having a predetermined length, the step and the mixing chamber cooperating to permit kinetic energy of the free stream of water to increase pressure of entrained air as the entrained air moves along the length of the mixing chamber, such that at an aft end of the mixing chamber the entrained air exerts a second pressure that is greater than ambient pressure, wherein the air is introduced into the cavity.

2. The system of claim 1, wherein the second pressure is equalized with static loading on the marine vessel in a vicinity of the cavity.

3. The system of claim 1, wherein the hull includes a longitudinal wall that extends under the underside substantially between the fore and aft planing surfaces and substantially parallel to the sidewalls such that the longitudinal wall divides the cavity into lateral cells.

4. The system of claim 1, further comprising an intermediate planing surface interposed intermediate the aft end of the mixing chamber and the aft planing surface, such that the intermediate planing surface divides the cavity into longitudinal cells.

5. The system of claim 1, further comprising:

an intermediate planing surface interposed intermediate the aft end of the mixing chamber and the aft planing surface, such that the intermediate planing surface divides the cavity into longitudinal cells; and wherein the hull includes a longitudinal wall under the underside that extends substantially between the fore and aft planing surfaces and substantially parallel to the sidewalls such that the longitudinal wall divides the cavity into lateral cells.

6. The system of claim 1, further comprising means for providing supplemental air into the cavity.

7. The system of claim 6, wherein the supplemental air includes engine exhaust.

8. The system of claim 6, wherein the supplemental air includes turbine bleed air.

9. The system of claim 1, wherein the marine vessel includes a powered marine vessel.

10. The system of claim 1, wherein the marine vessel includes a towed marine vessel.

11. The system of claim 1, wherein the marine vessel includes a catamaran and the hull is a multiple hull, the first and second sides including first and second hulls.

12. An air induction system for introducing air into a plurality of cavities under a hull of a marine vessel, the hull having an underside and first and second sidewalls, the hull having a first planing surface located toward a bow of the hull and an aft planing surface located toward a stern of the hull and a second planing surface located intermediate the first and aft planing surfaces, the plurality of cavities including a first cavity that is a volume bounded by the underside and the first and second sidewalls and the first and second planing surfaces, the plurality of cavities including a second cavity that is a volume bounded by the underside and the first and second sidewalls and the second and aft planing surfaces, the system comprising:

an air inlet arranged to receive air at ambient air pressure;

a first plenum arranged to receive air from the air inlet;

a first planing surface having a first trailing edge, the first planing surface being located toward a bow of the hull, the first trailing edge and the first plenum defining a first step having a finite height and extending spanwise substantially a width of the first trailing edge, the first step being arranged to communicate pneumatically and hydraulically with the first plenum, the first step being arranged to generate a first pressure that is less than ambient pressure as the marine vessel moves forwardly through water and a free stream of water moves past the first step, such that air communicated from the first plenum is entrainable in the free stream of water;

a first mixing chamber arranged to communicate pneumatically and hydraulically with the first step, the first mixing chamber having a predetermined length, the first step and the first mixing chamber cooperating to permit kinetic energy of the free stream of water to increase pressure of entrained air as the entrained air moves along the length of the first mixing chamber, such that at an aft end of the first mixing chamber the entrained air exerts a second pressure that is greater than ambient pressure, wherein the air is introduced into the first cavity;

at least a second plenum arranged to receive air from the air inlet, the second plenum being located aft of the first mixing chamber;

at least a second planing surface having a second trailing edge, the second planing surface being located aft of the first mixing chamber, the second trailing edge and the second plenum defining a second step having a finite height and extending spanwise substantially a width of the second trailing edge, the second step being arranged to communicate pneumatically and hydraulically with the second plenum, the second step being arranged to generate substantially the first pressure as the marine vessel moves forwardly through the water and a free stream of water moves past the second step, such that air communicated from the second plenum is entrainable in the free stream of water; and at least a second mixing chamber arranged to communicate pneumatically and hydraulically with the second step, the second mixing chamber having a predetermined length, the second step and the second mixing chamber cooperating to permit kinetic energy of the free stream of water to increase pressure of entrained air as the entrained air moves along the length of the second mixing chamber, such that at an aft end of the second mixing chamber the entrained air exerts a third pressure that is greater than ambient pressure, wherein the air is introduced into the second cavity.

13. The system of claim 12, wherein the second pressure is equalized with static loading on the marine vessel at the first cavity, and the third pressure is equalized with static loading on the marine vessel at the second cavity.

14. The system of claim 12, wherein the hull includes a first longitudinal wall under the underside that extends substantially between the first and second planing surfaces and substantially parallel to the sidewalls and a second longitudinal wall under the underside that extends substantially between the second and aft planing surfaces and substantially parallel to the sidewalls, such that the first longitudinal wall divides the first cavity into first lateral cells and the second longitudinal wall divides the second cavity into second lateral cells.

15. The system of claim 12, further comprising means for providing supplemental air into the cavity.

16. The system of claim 15, wherein the supplemental air includes engine exhaust.

17. The system of claim 15, wherein the supplemental air includes turbine bleed air.

18. The system of claim 12, wherein the marine vessel includes a powered marine vessel.

19. The system of claim 12, wherein the marine vessel includes a towed marine vessel.

20. The system of claim 12, wherein the marine vessel includes a catamaran and the hull is a multiple hull, the first and second sides including first and second hulls.

21. A marine vessel comprising:
a hull having a bow, a stern, a topside, an underside, a first side, and a second side;
an aft planing surface located toward the stern;
an air inlet arranged to receive air at ambient air pressure;
a plenum arranged to receive air from the air inlet;
a fore planing surface having a trailing edge, the fore planing surface being located toward the bow, the trailing edge and the plenum defining a step having a finite height and extending spanwise substantially a width of the trailing edge, the step being arranged to communicate pneumatically and hydraulically with the plenum, the step being arranged to generate a first pressure that is less than ambient pressure as the marine vessel moves forwardly through water and a free stream of water moves past the step, such that air communicated from the plenum is entrainable in the free stream of water; and
a mixing chamber arranged to communicate pneumatically and hydraulically with the step, the mixing chamber having a predetermined length, the step and the mixing chamber cooperating to permit kinetic energy of the free stream of water to increase pressure of air entrained in the water as the entrained air moves along the length of the mixing chamber, such that at an aft end of the mixing chamber the entrained air exerts a second pressure that is greater than ambient pressure, wherein the air is introduced into a cavity under the hull; and
an aft planing surface located toward the stern, the cavity being a volume bounded by the underside and the first and second sidewalls and the fore and aft planing surfaces.

22. The marine vessel of claim 21, wherein the second pressure is equalized with static loading on the marine vessel at the cavity.

23. The marine vessel of claim 21, further comprising a longitudinal wall that extends under the underside substantially between the fore and aft planing surfaces and substantially parallel to the sidewalls such that the longitudinal wall divides the cavity into lateral cells.

24. The marine vessel of claim 21, further comprising an intermediate planing surface interposed intermediate the aft end of the mixing chamber and the aft planing surface, such that the intermediate planing surface divides the cavity into longitudinal cells.

25. The marine vessel of claim 21, further comprising:
an intermediate planing surface interposed intermediate the aft end of the mixing chamber and the aft planing surface, such that the intermediate planing surface divides the cavity into longitudinal cells; and
wherein the hull includes a longitudinal wall under the underside that extends substantially between the fore and aft planing surfaces and substantially parallel to the sidewalls such that the longitudinal wall divides the cavity into lateral cells.

26. The marine vessel of claim 21, further comprising means for providing supplemental air into the cavity.

27. The marine vessel of claim 26, wherein the supplemental air includes engine exhaust.

28. The marine vessel of claim 26, wherein the supplemental air includes turbine bleed air.

29. The marine vessel of claim 21, wherein the marine vessel includes a powered vessel.

30. The marine vessel of claim 21, wherein the marine vessel includes a towed vessel.

31. The marine vessel of claim 21, wherein the marine vessel includes a catamaran and the hull is a multiple hull, the first and second sides including first and second hulls.

32. A marine vessel comprising:
a hull having a bow, a stern, a topside, an underside, a first side, and a second side;
a first sidewall having a first lower edge and a second sidewall having a second lower edge, the first and second sidewalls each extending from the bow to the stern, the first sidewall being attached to the hull along the first side, the second sidewall being attached to the hull along the second side, the first and second lower edges each being at a first distance from the topside;
an aft planing surface located toward the stern;
an air inlet arranged to receive air at ambient air pressure;
a first plenum arranged to receive air from the air inlet;
a first planing surface having a first trailing edge, the first planing surface being located toward the bow, the first trailing edge and the first plenum defining a first step having a finite height and extending spanwise substantially a width of the first trailing edge, the first step being arranged to communicate pneumatically and hydraulically with the first plenum, the first step being arranged to generate a first pressure that is less than ambient pressure as the marine vessel moves forwardly through water and a free stream of water moves past the first step, such that air communicated from the first plenum is entrainable in the free stream of water;

a first mixing chamber arranged to communicate pneumatically and hydraulically with the first step, the first mixing chamber having a predetermined length, the first step and the first mixing chamber cooperating to permit kinetic energy of the free stream of water to increase pressure of air entrained in the water as the entrained air moves along the length of the first mixing chamber, such that at an aft end of the first mixing chamber the entrained air exerts a second pressure that is greater than ambient pressure, wherein the air is introduced into a first cavity under the hull;

at least a second plenum arranged to receive air from the air inlet, the second plenum being located aft of the first mixing chamber;

at least a second planing surface having a second trailing edge, the second planing surface being located aft of the first mixing chamber, the second trailing edge and the second plenum defining a second step having a finite height and extending spanwise substantially a width of the second trailing edge, the second step being arranged to communicate pneumatically and hydraulically with the second plenum, the second step being arranged to generate substantially the first pressure as the marine vessel moves forwardly through water and a free stream of water moves past the second step, such that air communicated from the second plenum is entrainable in the free stream of water, and wherein the first cavity is a volume bounded by the underside and the first and second sidewalls and the first and second planing surfaces;

at least a second mixing chamber arranged to communicate pneumatically and hydraulically with the second step, the second mixing chamber having a predetermined length, the second step and the second mixing chamber cooperating to permit kinetic energy of the free stream of water to increase pressure of air entrained in the water as the entrained air moves along the length of the second mixing chamber, such that at an aft end of the second mixing chamber the entrained air exerts a third pressure that is greater than ambient pressure, wherein the air is introduced into a second cavity under the hull; and an aft planing surface located toward the stern, the second cavity being a volume bounded by the underside and the first and second sidewalls and the second and aft planing surfaces.

33. The marine vessel of claim 32, wherein the second pressure is equalized with static loading on the marine vessel at the first cavity, and the third pressure is equalized with static loading on the marine vessel at the second cavity.

34. The marine vessel of claim 32, further comprising a first longitudinal wall under the underside that extends substantially between the first and second planing surfaces and substantially parallel to the sidewalls, and a second longitudinal wall under the underside that extends substantially between the second and aft planing surfaces and substantially parallel to the sidewalls, such that the first longitudinal wall divides the first cavity into first lateral cells and the second longitudinal wall divides the second cavity into second lateral cells.

35. The marine vessel of claim 32, further comprising means for providing supplemental air into the cavity.

36. The marine vessel of claim 35, wherein the supplemental air includes engine exhaust.

37. The marine vessel of claim 35, wherein the supplemental air includes turbine bleed air.

38. The marine vessel of claim 32, wherein the marine vessel includes a powered vessel.

39. The marine vessel of claim 32, wherein the marine vessel includes a towed vessel.

40. The marine vessel of claim 32, wherein the marine vessel includes a catamaran and the hull is a multiple hull, the first and second sides including first and second hulls.

* * * * *